United States Patent [19]

Kazimi et al.

[11] Patent Number: 5,400,252
[45] Date of Patent: Mar. 21, 1995

[54] SPACECRAFT EAST/WEST ORBIT CONTROL DURING A NORTH OR SOUTH STATIONKEEPING MANEUVER

[75] Inventors: Fatima Kazimi, San Carlos; Lisa K. White, Menlo Park; Carl T. Plescia, Sunnyvale, all of Calif.

[73] Assignee: Space Systems/Loral, Inc., Palo Alto, Calif.

[21] Appl. No.: 994,769

[22] Filed: Dec. 22, 1992

[51] Int. Cl.⁶ .......................... B64G 1/26; G06F 15/50
[52] U.S. Cl. .................................... 364/434; 364/459; 244/169
[58] Field of Search ................. 364/459, 434; 244/164, 244/169, 170, 171

[56] References Cited
U.S. PATENT DOCUMENTS

| | | | |
|---|---|---|---|
| 3,866,025 | 2/1975 | Cavanagh | 364/434 |
| 3,944,172 | 3/1976 | Becker | 244/169 |
| 3,984,071 | 10/1976 | Fleming | 244/169 |
| 4,537,375 | 8/1985 | Chan | 244/171 |
| 4,767,084 | 8/1988 | Chan et al. | 244/164 |
| 4,837,699 | 6/1989 | Smay et al. | 364/434 |
| 4,848,706 | 7/1989 | Garg et al. | 244/169 |
| 5,251,855 | 10/1993 | Kaelsch | 244/172 |
| 5,310,143 | 5/1994 | Yocum et al. | 244/164 |
| 5,335,179 | 8/1994 | Boka et al. | 364/434 |

*Primary Examiner*—Michael Zanelli
*Attorney, Agent, or Firm*—Perman & Green

[57] ABSTRACT

A 3-axis stabilized spacecraft has primary and secondary attitude control thruster strings, thrusters in each string exerting roll, pitch and yaw torques. The primary and secondary thruster strings are similar and exhibit paired thrusters oriented on opposite sides of an East/West axis passing through the spacecraft. A stationkeeping input energizes the North or South thrusters to cause a maneuver of the spacecraft along a North-/South axis, the thrusters effecting a perturbation in the spacecraft's attitude. An attitude control system energizes at least a primary string thruster to counteract the attitude perturbation, the thruster being oriented so as also to cause a change in the spacecraft's East/West orbit velocity. A processor is responsive to the change in East/West orbit velocity reaching a deadband limit value to deactivate the primary string thruster and to activate the secondary string thruster which exhibits a similar torque effect on the spacecraft as the primary string thruster but is oriented so as to cause an oppositely directed change in the spacecraft's East/West orbit velocity. The spacecraft further includes a system for enabling all primary and secondary thrusters that exert a force in one direction (i.e. East or West) for attitude control during limit cycling and during the North or South stationkeeping maneuver. The like directed thrusters both provide attitude stabilization and cause a predetermined change in orbit velocity.

9 Claims, 6 Drawing Sheets

SPACECRAFT EAST/WEST ORBIT CONTROL DURING A NORTH OR SOUTH STATIONKEEPING MANEUVER

FIELD OF THE INVENTION

This invention relates to spacecraft orbit control and, more particularly, to a method and system for controlling spacecraft East/West orbit velocity changes during a North or South stationkeeping maneuver.

BACKGROUND OF THE ART

Figure 1:
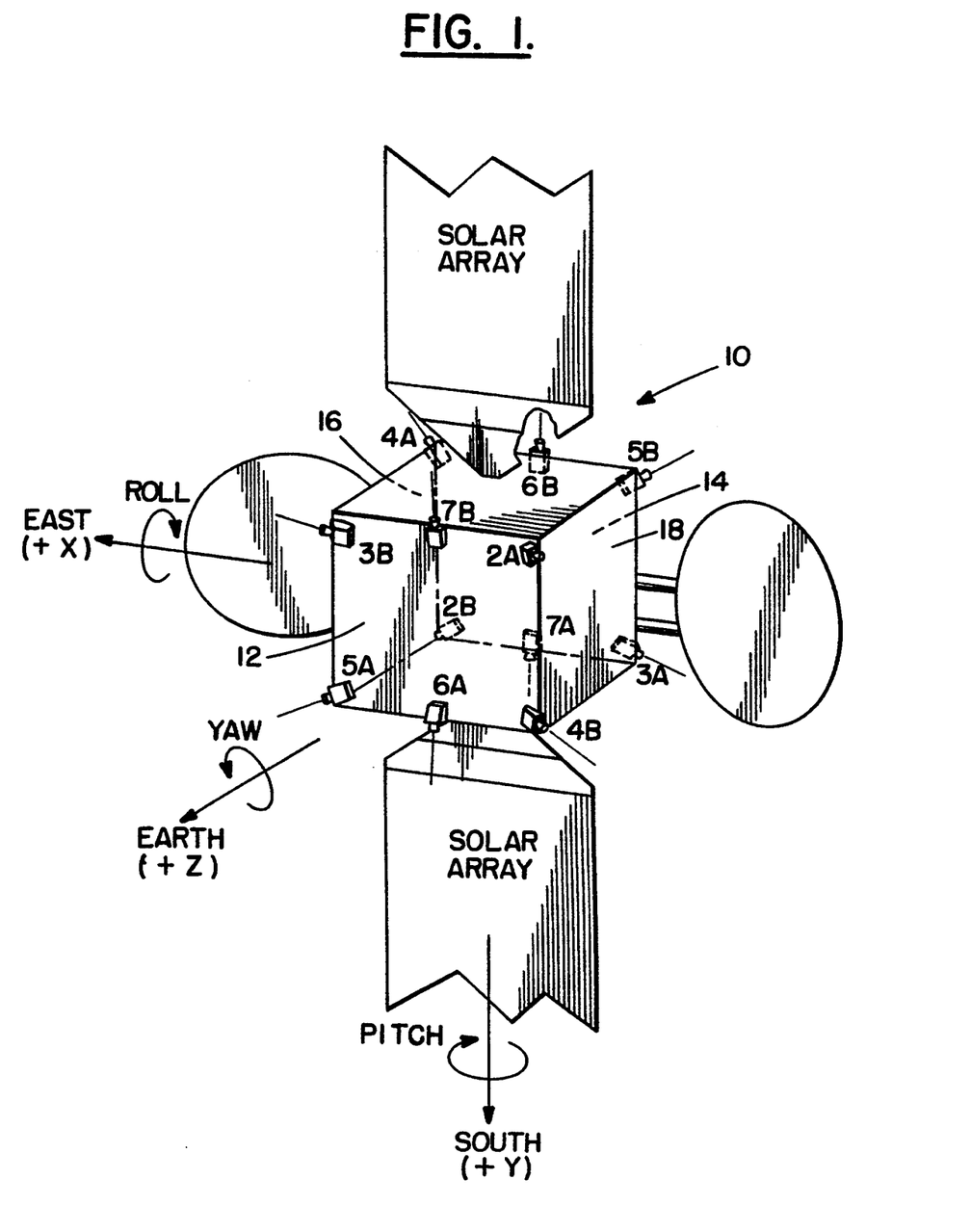
FIG. 1 is a perspective view of a spacecraft showing orientation of primary and secondary thruster strings, A or B, positioned on the Earth and anti-Earth panels.

FIG. 1 shows a spacecraft 10 that is 3-axis controlled by the action of strings of thrusters. Two strings of thrusters are employed, an A string and a B string. Thrusters from each string are disposed on an Earth facing panel 12 and an anti-Earth facing panel 14, and are oriented so as to provide full three-axis thrust forces and torques with each string. Full three-axis thrust torques can also be accomplished with a combination of 6 thrusters from both strings. Each thruster string includes two East and two West orbit velocity controlling thrusters and two North or two South orbit controlling thrusters. Each thruster string has an East and a West thruster mounted on Earth facing panel 12 and an East and a West thruster mounted on anti-Earth facing panel 14. Thus, thruster string A has thrusters 2A and 5A mounted on Earth facing panel 12 and thrusters 3A and 4A on anti-Earth facing panel 14. Thrusters 4A, 5A and 2B, 3B are generally eastward pointed adjacent East facing panel 16 and thrusters 2A, 3A and 4B, 5B are generally westward pointed adjacent West facing panel 18. South facing thrusters 6A and 7A are mounted on panels 12 and 14, respectively. The B string of thrusters are mounted in a similar manner, but thrusters 6B and 7B are North facing thrusters which provide South-direction thrust forces, as contrasted to thruster 6A and 7A which provide North directed thrust forces. The A string is the primary string for a North stationkeeping maneuver and the B string is the primary string for a South stationkeeping maneuver.

The 6 and 7 thrusters primarily provide roll torque, and the 2, 3, 4 and 5 thrusters primarily provide pitch and yaw torques.

Spacecraft 10 is assumed to be travelling in an easterly direction and its roll, pitch and yaw axes about the East, South and Earth directions are illustrated in FIG. 1. As is known to those skilled in the art, a geosynchronous spacecraft is often subjected to North or South stationkeeping orbit adjustments. Each such adjustment comprises a prescribed burn time of the 6A and 7A pair or 6B and 7B pair of thrusters to enable reorientation of the spacecraft's orbit in a North or South, respectively, direction.

If the torques exerted by thrusters 6B and 7B (for instance) have the identical magnitude but opposite sign, then the South stationkeeping maneuver will have negligible affect on the East/West orientation of spacecraft 10. However, this is often not the case and, due to variations in torque exerted by the firing thrusters, a torque effect is exerted on spacecraft 10. In response, an attitude control system within spacecraft 10 will compensate the unequal torques by causing the 6B or 7B thruster with the larger magnitude torque to pulse off, and to pulse on one or more East/West thrusters in a string. The firing of East/West attitude control thrusters (e.g., 2B-5B) results in force components being exerted along the East/West axis of the spacecraft's travel direction. Such forces can and do affect the spacecraft's orbit velocity and cause it to lose its longitudinal position relative to the Earth.

Figure 2:
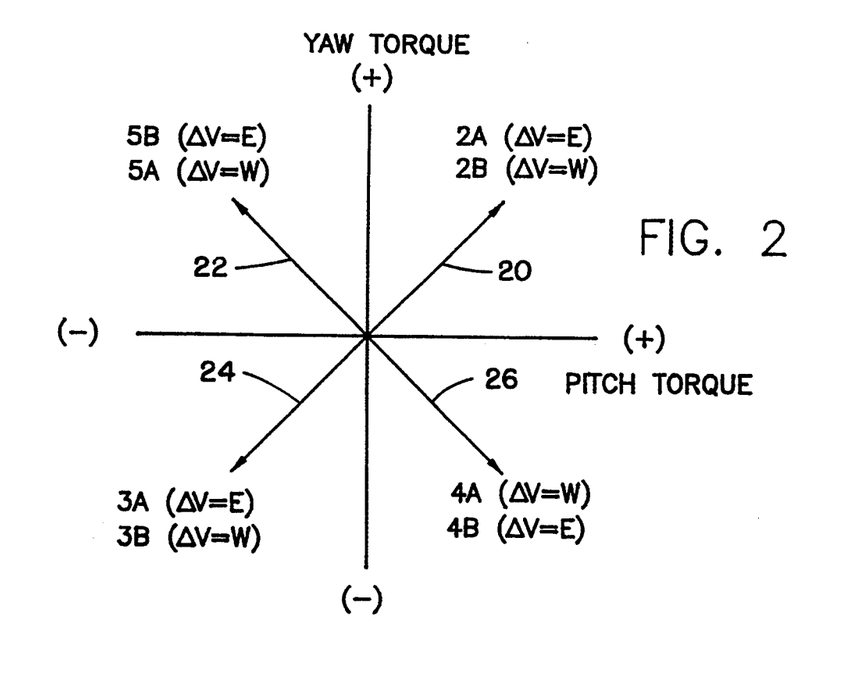
FIG. 2 is a plot of pitch torque versus yaw torque, the plot indicating the principal torques exerted by the specific thrusters of FIG. 1, including the principal orbit velocity effects thereof.

In FIG. 2, a plot is shown of pitch torque versus yaw torque. Vectors 20, 22, 24 and 26 illustrate the torque effects of the indicated thrusters. Thus, thruster 2A exerts both yaw and pitch component torques when it is pulsed. Similarly, thruster 2B (from string B) exerts similarly directed yaw and pitch torques when it is pulsed. But, thruster 2A and 2B are oppositely oriented so that thruster 2A exerts a force in the easterly direction and thruster 2B exerts a force in the westerly direction. Thus, when thruster 2A is pulsed, its yaw and pitch torque components create an increase in velocity in the easterly direction of spacecraft 10. Thruster 2B, by contrast, will exert a similar magnitude but oppositely directed affect on the velocity of spacecraft 10, and at the same time will exert similar yaw and pitch torques as thruster 2A.

It can be seen that by activating specific thrusters, pitch or yaw torques can be exerted on spacecraft 10 in such a manner as to counteract torques created by unbalanced North or South thrusters 6A, 7A or 6B, 7B. For instance, if a positive pitch torque is desired, thrusters 2A and 4A can be pulsed to provide a combined positive directed pitch torque. They also exert opposite and offsetting yaw torques. As can be seen from the positioning of thrusters 6A and 7A in FIG. 1, their simultaneous firing will impart a northerly velocity to spacecraft 10 and will primarily provide roll torque when one thruster is pulsed. Simultaneous firing of thrusters 6B and 7B provide a southerly directed thrust and also create, primarily, a roll torque when one thruster is pulsed.

The prior art describes a number of techniques for spacecraft attitude control, both through the use of coupled thrusters and through other techniques. U.S. Pat. No. 4,848,706 to Garg et al. describes a 3-axis control system wherein thruster locations cause significant cross-coupling torques. Attitude control signals are generated for spacecraft adjustment that take into consideration and automatically compensate for the cross-coupling torques.

U.S. Pat. No. 3,866,025 to Cavanagh describes a spacecraft attitude control system wherein orbit-adjust thrusters are used to perform both orbital inclination adjustment and roll or yaw attitude control. A reference system provides signals that enable an onboard computer to derive a shortest angle through which the total angular momentum vector of the spacecraft must be rotated to bring it into alignment with an orbit normal vector. In addition, an ideal torque is calculated to produce the rotation of the total angular momentum vector. A combination of orbit thrust adjusters is then chosen to produce a torque which best approximates the ideal torque.

U.S. Pat. No. 4,837,699 to Smay et al. describes a geosynchronous spacecraft control system that detects spin axis precession and develops thruster control signals to restore the spin axis to the desired attitude.

U.S. Pat. No. 4,767,084 to Chan et al. describes a stationkeeping maneuver for a 3-axis stabilized spacecraft in a geosynchronous orbit. When a momentum/reaction wheel in the spacecraft reaches saturation, thrusters are energized to desaturate the momentum/reaction wheel while simultaneously accomplishing a preselected compensation of the spacecraft in East/West position.

U.S. Pat. No. 3,984,071 to Fleming describes a control apparatus for damping roll/yaw motion within a control deadband of a spacecraft. When an error signal indicates an out-of-deadband condition, the control system initiates and controls the duration of operation of a thruster of proper orientation to cause the spacecraft's orientation to return to within deadband limits.

U.S. Pat. No. 3,944,172 to Becker describes another attitude control system wherein thrust bursts are employed to impart incremental momenta to the space vehicle when the vehicle moves beyond selected discrete deviations.

In the above attitude control systems, East/West orbit control is not performed simultaneously with a North or South stationkeeping maneuver.

It is an object of this invention to provide a method for East/West orbit control simultaneously with a North or South stationkeeping maneuver of a spacecraft, all while controlling spacecraft attitude.

SUMMARY OF THE INVENTION

A 3-axis stabilized spacecraft has primary and secondary attitude control thruster strings, thrusters in each string exerting roll, pitch and yaw torques. The primary and secondary thruster strings are similar and exhibit paired thrusters oriented on opposite sides of an East/West axis passing through the spacecraft. A stationkeeping input energizes either the North or South thrusters to cause a maneuver of the spacecraft along a North or South axis, the thrusters effecting a perturbation in the spacecraft's attitude. To counteract the attitude perturbation, the attitude control system pulses off at least one of the 6/7 thrusters of the North or South thruster pair. In addition, the attitude control system pulses on at least one of the 2, 3, 4 or 5 primary string thrusters. This results in a desired change in the spacecraft's North or South orbit velocity and an undesired change in the spacecraft's East or West orbit velocity. A processor is responsive to the change in East or West orbit velocity reaching a deadband limit value to deactivate the primary string 2, 3, 4 and 5 thrusters and to activate the secondary 2, 3, 4 and 5 thrusters which exhibit a similar torque effect on the spacecraft as the primary string, but are oriented so as to cause an oppositely directed change in the spacecraft's East/West orbit velocity. This invention assumes that the disturbance torque which is being counteracted by the 2, 3, 4 and/or 5 thrusters stays in the same general direction throughout the North or South maneuver. The spacecraft further includes a system for enabling a combination of primary and secondary 2, 3, 4 and 5 thrusters so as to exert a force in one direction (i.e. East or West) for attitude control during limit cycling, both prior to and after a stationkeeping maneuver. The like directed thrusters both provide attitude stabilization and cause a predetermined change in orbit velocity.

DETAILED DESCRIPTION OF THE INVENTION

Figure 3:
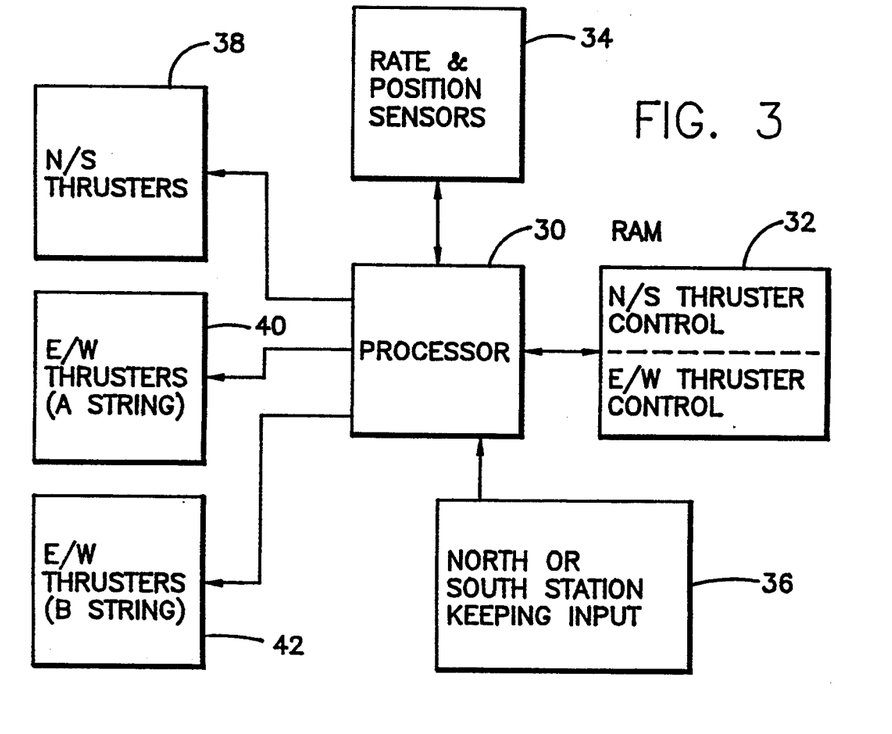
FIG. 3 is a high level block diagram of a control apparatus within the spacecraft of FIG. 1.

In FIG. 3, a high level block diagram of a spacecraft control system includes a processor 30 and a random access memory (RAM) 32. RAM 32 includes procedures for both North or South thruster control and East/West thruster control. Further inputs to processor 30 are received from attitude rate and position sensors 34 that provide signals indicative of spacecraft orbit velocity and attitude changes.

A North or South stationkeeping input 36 may be received from either ground or from on-spacecraft. Processor 30 responds to a North or South stationkeeping input by operating a North or South thruster pair 38. At the same time, processor 30 responds to inputs from attitude rate and position sensors 34 to appropriately cause the operating North or South thruster pair 38 and the A-string East/West thrusters 40 to perform attitude control actions. The B-string East/West thrusters 42 is also provided and may be similarly controlled from processor 30. Processor 30 is also able to independently operate any selected thrusters from both strings A and B to achieve full attitude control, while simultaneously achieving a desired orbit velocity change. The operation of the system of FIG. 3 will be described hereinafter with respect to the flow diagrams shown in FIGS. 4A-6.

Figure 4A:
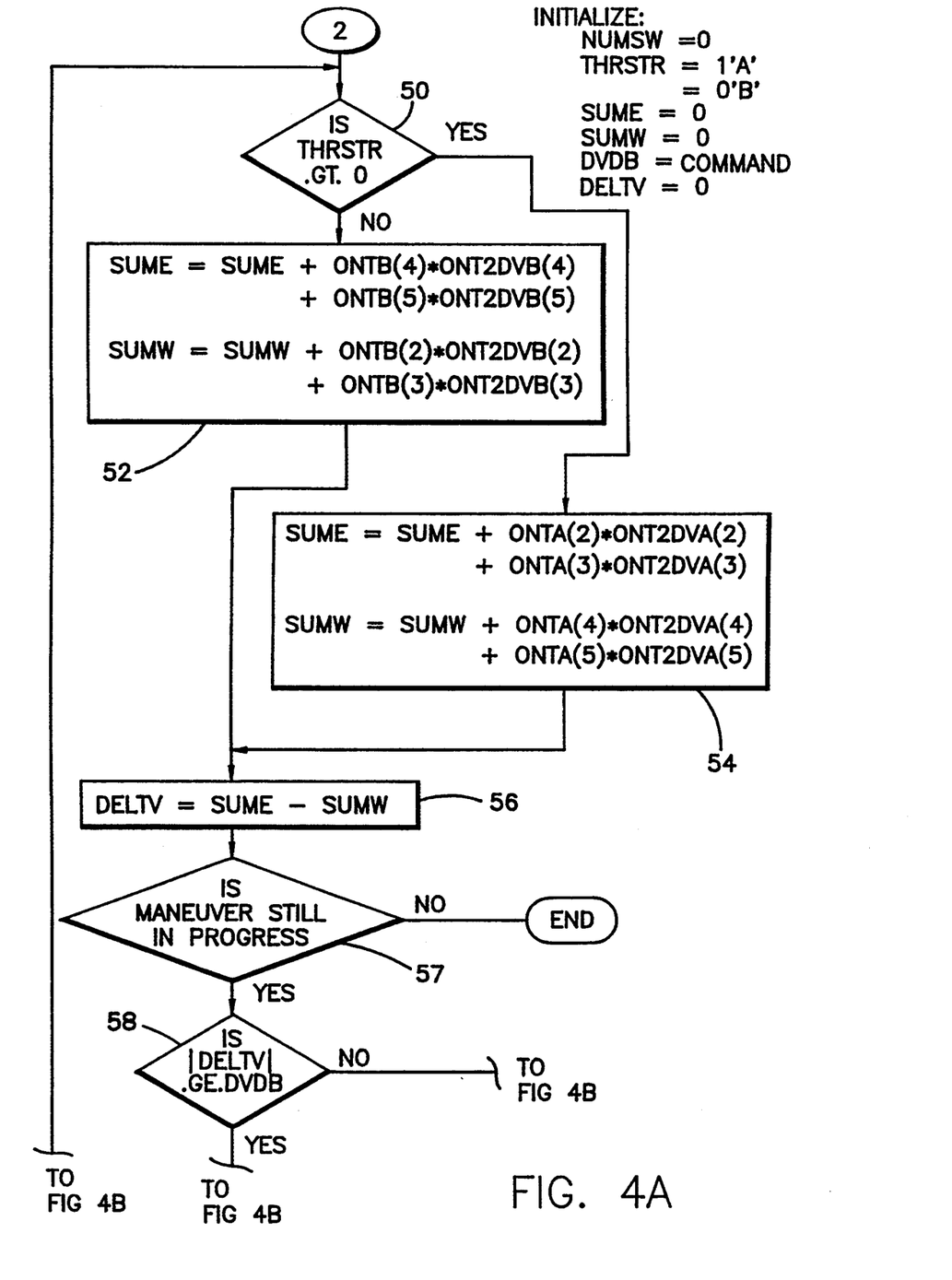
FIGS. 4A and 4B are a high level flow diagram illustrating the method of the invention for minimizing East/West orbit velocity changes during a North or South stationkeeping maneuver.
Figure 4B:
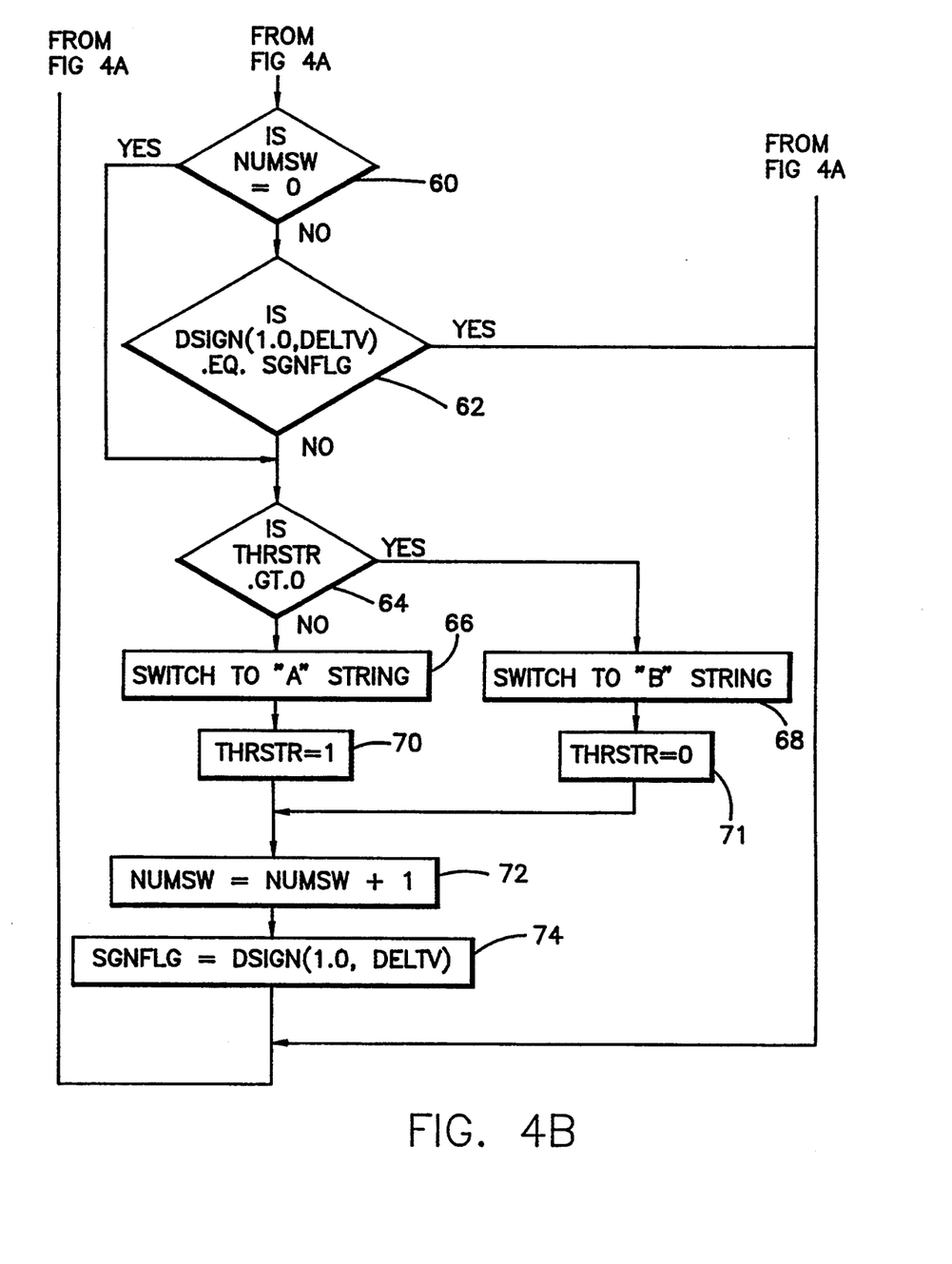

Turning to FIGS. 4A and 4B, a procedure is shown that enables spacecraft East/West orbit control during a North or South stationkeeping maneuver for a spacecraft under 3-axis thruster attitude control. As above indicated, the firing of a pair of North (or South) thrusters will often cause, as a result of an imbalance in thrusts and moment arms, a disturbance torque in all three axes resulting in an attitude change of the spacecraft. In the prior art, processor 30 would respond to such an attitude perturbation by appropriately modulating the thruster action of one of the North (or South) maneuver thrusters and one or more East/West thrusters to compensate for the attitude change. This action would, however, create a change in orbit velocity due to the East/West force components of the East/West thruster firings. Such orbit velocity changes would then require a special compensation maneuver.

The procedure shown in FIGS. 4A and 4B enables East/West orbit velocity control (within a "deadband" margin) during a North or South stationkeeping maneuver while maintaining attitude using 3-axis thruster control. In brief, this is achieved by alternately energizing the principal string of East/West thrusters (e.g. A string) for a North maneuver until the orbit velocity change reaches one limit of the orbit velocity deadband and then switching attitude control to the secondary set (e.g. B string) of East/West thrusters so as to both continue attitude control and to cause an equal and opposite orbit velocity change. Thus, both East/West thruster strings are alternately energized as orbit velocity changes reach deadband limits so that the net East/West spacecraft orbit velocity oscillates between these limits, but maintains a desired average orbit velocity.

Referring back to FIGS. 1-3, assume that spacecraft 10 is in the course of a North stationkeeping maneuver and that attitude rate and position sensors 34 cause processor 30 to call for positive changes in both yaw and pitch torques. Processor 30 responds by energizing thruster 2A to achieve a compensating torque thrust. Note that when thruster 2A fires, it creates a change in orbit velocity in the easterly direction.

When the value of the orbit velocity change reaches a preset limit, processor 30 switches to the B string of East/West thrusters. Then, when processor 30 calls for positive changes in yaw and pitch torques, thruster 2B is energized so as to achieve similar yaw and pitch torque corrections as thruster 2A. Note, however, that thruster 2B exerts a force component in the westerly direction and acts to overcome the easterly velocity change created by thruster 2A. When the spacecraft orbit velocity change reaches a deadband limit, processor 30 again switches to the East/West A-string and reenergizes thruster 2A. This procedure continues until the termination of the North stationkeeping maneuver, at which time, spacecraft attitude limit cycling is enabled and spacecraft stabilization is maintained (until the 3-axis thruster control mode is exited).

It is assumed that switching between the A and B string East/West thrusters negligibly affects the direction of the disturbance torque (caused primarily by the North (or South) thruster pair) which the East/West thrusters are counteracting. The following are definitions of parameters used in the flow diagrams of FIGS. 4A and 4B:

| | |
|---|---|
| THRSTR | Thruster string enabled for Pitch/Yaw thrusters (+1='A', 0='B') |
| ONTA(i) | Pitch/Yaw 'A' string ith thruster on-time (time of firing) each cycle (sec) |
| ONTB(i) | Pitch/Yaw 'B' string ith thruster on-time (time of firing) each cycle (sec) |
| ONT2DVA(i) | Pitch/Yaw 'A' string ith thruster constant for conversion from on-time to delta-V (m/sec/sec) |
| ONT2DVB(i) | Pitch/Yaw 'B' string ith thruster constant for conversion from on-time to delta-V (m/sec/sec) |
| SUME | Total east delta-V (m/s) |
| SUMW | Total west delta-V (m/s) |
| DELTV | Accumulated residual delta-V (m/s) [(+)=East; (−)=West] Delta-V is a change in orbital velocity |
| DVDB | Delta-V deadband (m/s) (> 0.005 m/sec) |
| NUMSW | Flag to prevent premature switching |
| SGNFLG | Sign flag to prevent premature switching |

As indicated above, it is assumed that spacecraft 10 is in the process of executing a North (or South) stationkeeping maneuver and that there is a torque imbalance in the North (or South) thrusters that is causing a change in the attitude of spacecraft 10. At the commencement of the procedure in FIGS. 4A and 4B, certain of the parameters are initialized as shown in the upper right of FIG. 4A. The significance of the initialization values will become apparent as the procedure is explained.

Decision box 50 initially asks whether the thruster value is greater than 0 (i.e., is thruster A string or thruster B string energized?). If the B string of thrusters is energized (THRSTR=0), the procedure moves to box 52, whereas if string A is energized (THRSTR=1), the procedure moves to box 54. The calculations in both boxes are identical, except for the fact that different thrusters are active.

Assuming that thruster B string is active, the total East (SUME) and total West (SUMW) orbital velocity changes are calculated. SUME is calculated by adding to the previously calculated SUME, the product of the firing time of thruster 4B (ONTB4) and a constant (ONT2DVB4) that converts the firing time of thruster 4B to a velocity value. SUME is also calculated for thruster 5B and is added to the aforesaid values. From FIG. 2 it can be seen that thrusters 4B and 5B both exhibit easterly orbit velocity effects. Similarly, the sum of the westerly (SUMW) components are calculated as shown in box 52 for thrusters 2B and 3B.

The procedure then determines (box 56) the summation of SUME and SUMW components to arrive at an accumulated residual orbit velocity change (DELTV) (a positive value if it is easterly and a negative value if it is westerly). As shown by decision box 57, the procedure tests to determine that the maneuver is still in progress. If not, the procedure ends. If yes, the procedure compares (decision box 58) the absolute value of DELTV to the preestablished Delta-V deadband limits (DVDB). If the absolute value of DELTV is not greater than DVDB, then the procedure bypasses and recycles back to the start.

At some point, the absolute value of the accumulated residual Delta-V exceeds a deadband limit (DVDB). At such time, the procedure moves to decision box 60 to determine if there has been a previous thruster string switch. If there has been none, the procedure skips decision box 62 and proceeds to decision box 64 where it is again determined whether the A string or B string of the pitch/yaw thrusters is energized. As indicated above, it was assumed that the B string is energized, so the procedure moves to box 66 and switches control to the A string. As a result, the corresponding thruster (or thrusters) in the A string is now fired, causing identical pitch/yaw attitude control but an opposite orbit velocity effect. Thus, attitude control is continued during the stationkeeping maneuver and orbit velocity is maintained.

The thruster value is now switched to equal 1 (box 70), which value will be sensed in decision boxes 50 and 64 when the procedure recycles. The NUMSW value is incremented by 1 (box 72) and a sign flag (box 74) has its sign set equal to the sign of the value of DELTV that caused (decision box 58) the thruster string switch. Thus, if it is assumed that DELTV (in box 56) reached a boundary of the velocity limit in the westerly direction, DELTV would exhibit a negative value. That negative value is assigned to the sign flag in box 74.

The procedure shown in FIGS. 4A and 4B repeats every processor cycle so, upon the next processor cycle, the procedure repeats (assuming the maneuver is still in progress). At this stage, decision box 50, because the A string is now energized, causes the calculation of the values of SUME and SUMW as shown in box 54. It is to be noted from FIG. 2, that the A string thrusters 2A and 3A cause easterly directed velocity changes and thrusters 4A and 5A cause westerly directed velocity changes. Thus, each of the thrusters shown in box 54, depending upon their respective ON-times, will contribute to easterly and westerly orbit velocity changes.

The calculated values of SUME and SUMW are summed in box 56 to arrive at an accumulated residual DELTV. Here, it is to be remembered that thrusters are not necessarily energized during every computer cycle. Therefore, there will likely be a plurality of computer cycles where there has been no change in DELTV since the previous computer cycle.

Once thrusters have fired and a change in DELTV has occurred, but a deadband limit has not been reached (DVDB), decision box 58 causes a short circuit of the procedure, as shown. If DELTV has not changed (i.e., no firing of thrusters has occurred since thruster string switch), decision box 58 indicates the same "greater than" condition as in a previous processor cycle. However, the value of NUMSW has been incremented to a value greater than 0 (decision box 72), so the procedure moves to decision box 62. Here it is determined whether the sign of DELTV is the same as the sign flag (recalling that it was set equal to the sign of DELTV on the previous cycle). Thus, if there has been no operation of the thrusters to change the sign of DELTV, then the value of the sign flag remains equal to DELTV and no thruster string switch occurs (thruster string A remains operational). When and if the value of DELTV again reaches an opposite DVDB deadband value, a further thruster string switch will occur (box 68) as indicated in FIG. 4B.

It can thus be seen that A string and B string pitch/yaw thrusters that exert pitch/yaw torques in an identical direction are repetitively switched into action during the North or South stationkeeping maneuver. While the pitch/yaw thrusters exhibit similar torque characteristics, they exhibit opposite orbit velocity components and thereby tend to balance out during the course of the North or South maneuver.

Both before and after a North or South stationkeeping maneuver (while under 3-axis thruster control), spacecraft 10 is caused to execute "limit cycling" wherein its attitude is closely controlled by a single thruster string. Limit cycling causes a spacecraft's attitude to cycle back and forth between attitude limits so that it is stabilized both before and after the North-/South maneuver. Limit cycling, using a single thruster string, will generally not cause an accumulation of East/West orbit velocity changes, as the velocity changes introduced by the various thruster operations cancel out.

Figure 5:
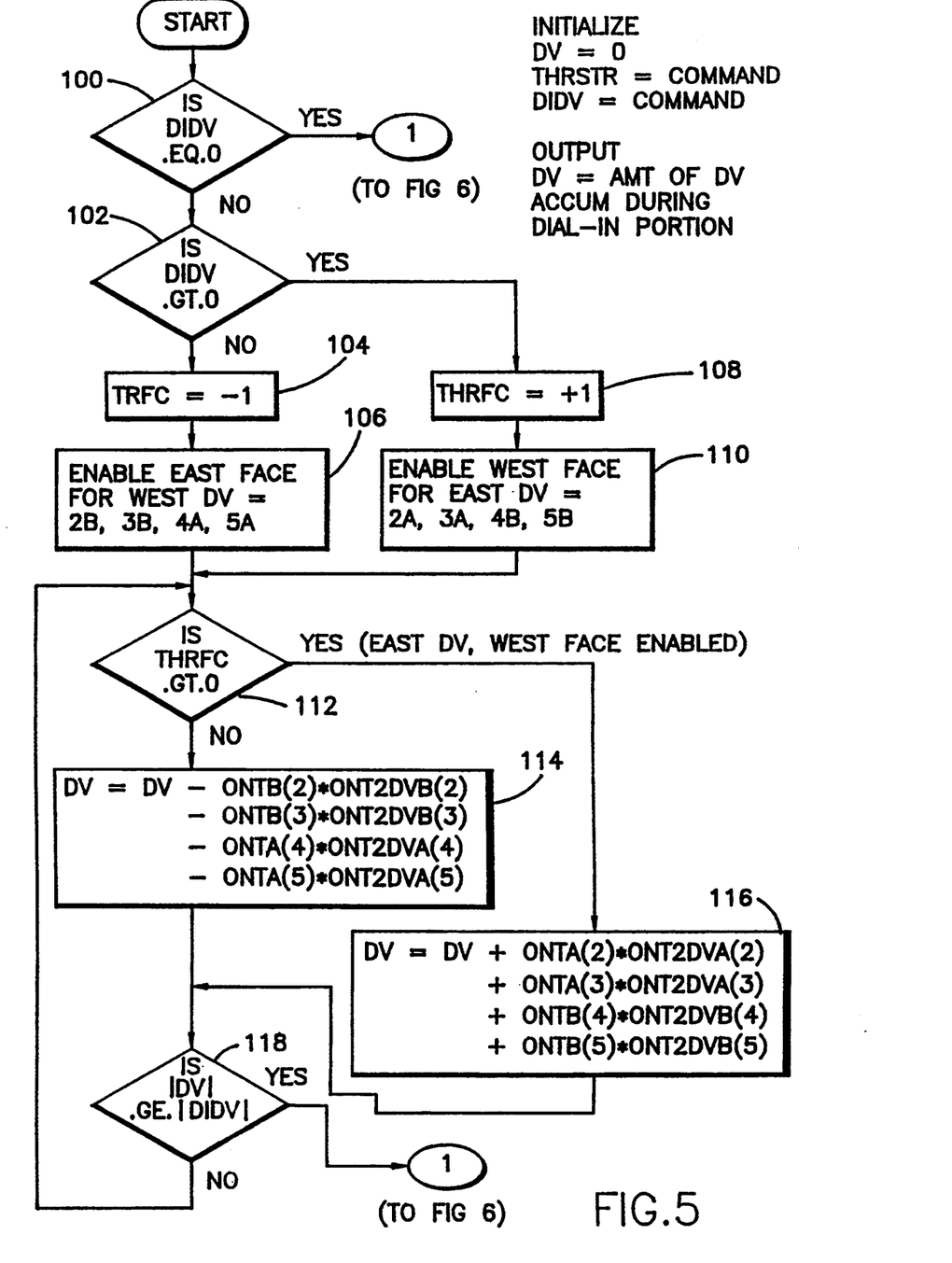
FIGS. 5 and 6 illustrate a further flow diagram of a method for controlling the East/West thrusters of the spacecraft during attitude limit cycling so as to cause a predetermined change in orbit velocity of the spacecraft.
Figure 6:
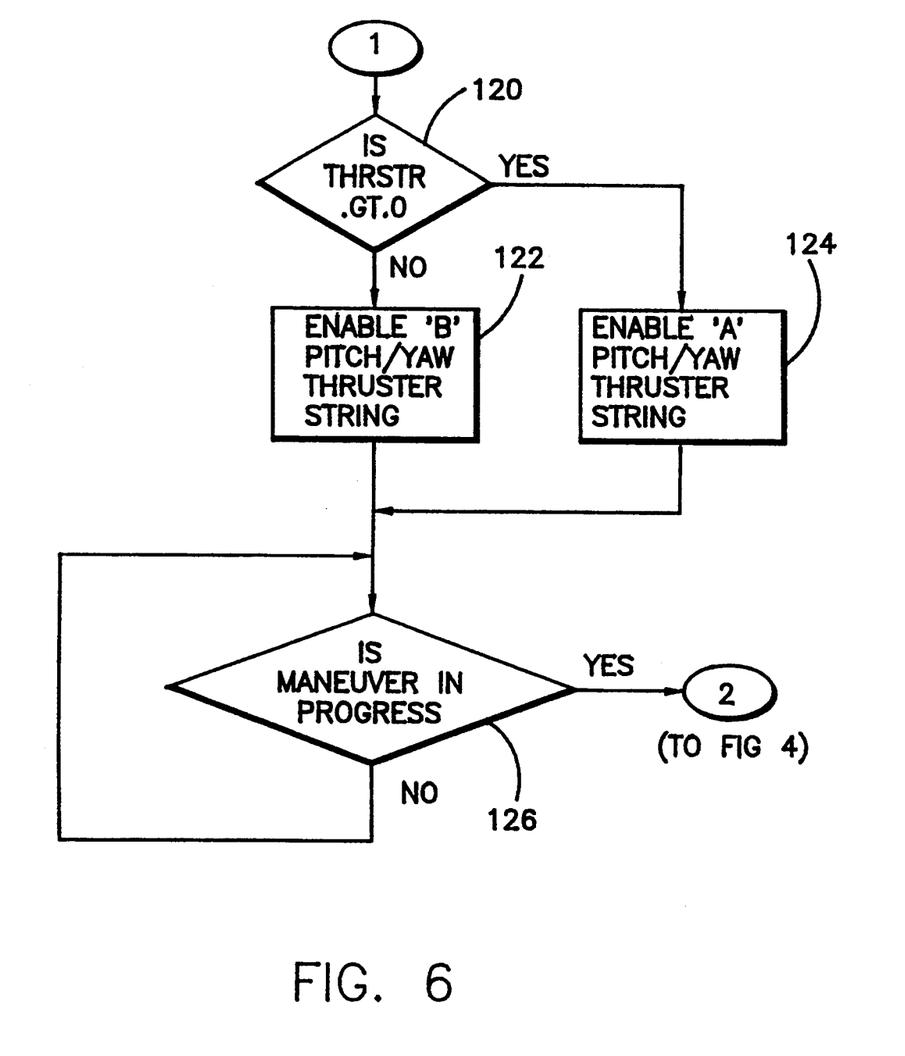

It has been determined, however, that by careful selection of thrusters from the A and B strings, that an orbital velocity change can be achieved during limit cycling and during the maneuver, without requiring excess expenditure of on-board propellant. Such a procedure is shown in FIGS. 5 and 6. The desired East or West orbital velocity change will be referred to as a "dial-in" Delta-V.

The parameters illustrated in FIGS. 5 and 6 are shown below:

| Parameter | Definition |
|---|---|
| DIDV | Dial-in East or West delta-V (+=East, −=West, 0=no delta-V) |
| THRFC | Thruster face enabled (+1=West, −1=East) |
| DV | Accumulated dial-in delta-V (m/s) (+=East, −=West) |
| ONTA(i) | Pitch/Yaw 'A' string ith thruster on-time each cycle (sec) |
| ONTB(i) | Pitch/Yaw 'B' string ith thruster on-time each cycle (sec) |
| ONT2DVA(i) | Pitch/Yaw 'A' string ith thruster constant for conversion from on-time to delta-V (m/sec/sec) |
| ONT2DVB(i) | Pitch/Yaw 'B' string ith thruster constant for conversion from on-time to delta-V (m/sec/sec) |

-continued

| Parameter | Definition |
|---|---|
| THRSTR | Thruster string enabled for Pitch/Yaw thrusters (+1='A', 0='B') |
| DELTV | Accumulated residual East or West delta-V (m/s) (+=East, −=West) |

As will be hereafter understood, to achieve an East or West orbital velocity change, the procedure of FIG. 5 employs either all east-directed pitch/yaw thrusters or all west-directed pitch/yaw thrusters (from both A and B strings) for attitude control. Thus, the procedure either utilizes thrusters 2A, 3A, 4B and 5B that are adjacent West face 18 or employs thrusters 2B, 3B, 4A and 5A that are adjacent East face 16.

Referring to FIG. 5, decision box 100 tests whether the value of the dial-in East/West orbital velocity change (DIDV) is zero. If yes, then no dial-in delta-V is desired and the procedure moves to FIG. 6 and enables a string of Pitch/Yaw thrusters and waits until the maneuver starts.

If a dial-in East/West orbit velocity change is desired, the procedure moves to decision box 102 where the sign of DIDV is determined. If its value is greater than 0, its sign is plus (easterly), whereas if it is less than 0, its sign is minus (westerly). An easterly delta-V implies an overall decrease in orbital velocity, whereas a westerly delta-V implies an overall increase in orbital velocity. DIDV is now assumed to be a negative value, therefore, the thrusters adjacent to East face 16 are enabled (boxes 104, 106), including thrusters 2B, 3B, 4A and 5A. By contrast, if DIDV is a positive value, the thrusters adjacent west face 18 are enabled (boxes 108, 110).

The procedure now moves to decision box 112 where it is determined that the East facing thrusters have been enabled for West delta-V (i.e. THRFC is not greater than 0). The accumulated delta-V (DV) is now calculated as shown in box 114. In decision box 118, it is determined whether the magnitude of the value DV is greater than or equal to DIDV. If the answer is yes, no further velocity corrections are performed and the procedure moves to FIG. 6. If the answer is no, the procedure recycles and the East facing thrusters remain enabled during limit cycling and potentially into the North or South maneuver. Attitude control during limit cycling or during the maneuver causes pitch/yaw thruster firing(s) which causes a change in the value of DV.

When the yes condition is finally satisfied in decision box 118, the procedure moves to decision box 120 in FIG. 6 where it is determined which pitch/yaw thruster string of spacecraft 10 is to be enabled. In such case, the control procedure switches from a dial-in mode and reverts back to the control mode wherein either the A or B thruster strings are enabled to maintain control of the spacecraft's attitude. In decision box 126, if the maneuver is not in progress, the algorithm waits while the spacecraft attitude limit cycles. When the maneuver starts, or if the maneuver is in progress, the algorithm proceeds to FIGS. 4A and 4B until the completion of the North or South stationkeeping maneuver and a subsequent limit cycling period.

It should be understood that the foregoing description is only illustrative of the invention. Various alternatives and modifications can be devised by those skilled in the art without departing from the invention. For instance, the attitude control apparatus disclosed herein can be operated with decoupled thrusters (i.e. thrusters that exert a torque in only a pitch or yaw direction, but not both). In addition, a dial-in delta-V capability could be devised for strings of Pitch/Yaw thrusters rather than a face of Pitch/Yaw thrusters. Accordingly, the present invention is intended to embrace all such alternatives, modifications and variances which fall within the scope of the appended claims.

We claim:

1. A spacecraft having primary and secondary, three axis attitude control thruster strings, thrusters in each string producing roll, pitch and yaw torques, said primary and secondary thruster strings exhibiting thrusters oriented on opposite sides of an East/West axis passing through said spacecraft, said spacecraft further comprising:
means for energizing North or South thrusters in a said thruster string to cause a maneuver along a North or South axis, said thrusters effecting an attitude perturbation of said spacecraft;
means for establishing an East/West deadband range of orbit velocity values, said deadband range having limit values;
attitude control means for energizing at least a primary string thruster to counteract said attitude perturbation, said primary string thruster being oriented so as to cause a change in said orbit velocity in a first direction along said East/West axis;
means for determining changes in orbit velocity; and
means responsive to a said change in orbit velocity reaching a limit value, to deactivate said primary string thruster and to activate a secondary string thruster exhibiting a substantially similar torque effect on said spacecraft as said deactivated primary string thruster, but being oriented so as to cause an oppositely directed change in said orbit velocity along said East/West axis.

2. The spacecraft as recited in claim 1 wherein four thrusters in said primary string have a paired thruster in said secondary string, each said thruster and paired thruster, when enabled, exerting a similar torque effect on the attitude of the spacecraft, each thruster of said pair oriented so as to cause oppositely directed force components along said East/West axis, said responsive means, upon terminating activation of a thruster of the four said thrusters in said primary string, activating said primary thruster's paired thruster in said secondary string.

3. The spacecraft as recited in claim 2, wherein said responsive means switches between thrusters in said primary and secondary strings each time a deadband limit value of orbit velocity is reached.

4. A spacecraft having at least primary and secondary thruster strings, and at least four East/West oriented thrusters in each string, each said thruster oriented to provide pitch/yaw torque components when fired, first and second thrusters of the primary string and third and fourth thrusters of the secondary string oriented so as to provide a force component along a easterly axis of said spacecraft and first and second thrusters of the secondary string and third and fourth thrusters of the primary string oriented to provide a force component along a westerly axis of said spacecraft, said spacecraft further comprising:
means for operating a thruster string to provide limit cycling attitude control for said spacecraft; and
control means responsive to a command to alter said spacecraft's orbital velocity by an increment, by enabling four thrusters, two from said primary string and two from said secondary string, said four enabled thrusters all exhibiting a force component in a common East/West axial direction, said four thrusters, when energized for attitude control purposes, all exerting a common force component that tends to alter said orbital velocity while, simultaneously controlling said spacecraft's attitude.

5. The spacecraft as recited in claim 4 wherein said four enabled thrusters from said primary and secondary strings enable East/West orbit control of said spacecraft.

6. The spacecraft as recited in claim 5 wherein said control means can be enabled to react to a command to alter orbital velocity during a North or South stationkeeping maneuver.

7. A spacecraft having primary and secondary, three axis attitude control thruster strings, thrusters in each string producing roll, pitch and yaw torques, said primary and secondary thruster strings exhibiting thrusters oriented on opposite sides of an East/West axis passing through said spacecraft, said spacecraft further comprising:
means for energizing North or South thrusters to cause a maneuver along a North or South axis, said thrusters effecting an attitude perturbation of said spacecraft;
attitude control means for energizing at least a primary string thruster to counteract said attitude perturbation, said primary string thruster being oriented so as to cause a change in orbit velocity in a first direction along said East/West axis;
means for determining orbit velocity changes due to thruster energizations and for signalling when an orbit velocity change reaches a limit value; and
means responsive to a said signal to deactivate said primary string thruster and to activate a secondary string thruster exhibiting a substantially similar torque effect on said spacecraft as said deactivated primary string thruster, but being oriented so as to cause an oppositely directed change in said orbit velocity along said East/West axis.

8. The spacecraft as recited in claim 7 wherein each one of plural thrusters in said primary string has a paired thruster in said secondary string, each said thruster and paired thruster, when enabled, exerting a similar torque effect on the attitude of the spacecraft, each thruster of said pair oriented so as to cause oppositely directed force components along said East/West axis, said responsive means, upon terminating activation of a thruster in said primary string, activating said primary thruster's paired thruster in said secondary string.

9. The spacecraft as recited in claim 8, wherein said responsive means switches between thrusters in said primary and secondary strings each time a said limit value of orbit velocity is reached.

* * * * *